United States Patent
McManus et al.

(10) Patent No.: US 7,716,659 B2
(45) Date of Patent: May 11, 2010

(54) REMOTE MONITORING AND SOFTWARE DISTRIBUTION SYSTEM FOR SERVICING INSERTER SYSTEMS

(75) Inventors: Deborah R. McManus, Bethel, CT (US); John H. Winkelman, Southbury, CT (US); Surya R. Sagi, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 2080 days.

(21) Appl. No.: 10/278,460

(22) Filed: Oct. 23, 2002

(65) Prior Publication Data

US 2003/0101446 A1 May 29, 2003

Related U.S. Application Data

(60) Provisional application No. 60/348,237, filed on Oct. 23, 2001.

(51) Int. Cl.
G06F 9/44 (2006.01)
G06F 9/445 (2006.01)
G06F 21/00 (2006.01)
G06F 17/30 (2006.01)
G06F 7/00 (2006.01)

(52) U.S. Cl. .................. 717/172; 717/174; 705/60; 707/10; 700/220

(58) Field of Classification Search ......... 717/172–178; 707/204, 10; 705/60; 700/220
See application file for complete search history.

(56) References Cited

U.S. PATENT DOCUMENTS 5,266,781 A * 11/1993 Warwick et al. ............ 235/375
5,419,440 A * 5/1995 Picoult ....................... 209/583
5,581,461 A * 12/1996 Coll et al. ...................... 705/5
5,754,434 A * 5/1998 Delfer et al. ................ 700/223
5,778,377 A * 7/1998 Marlin et al. ........... 707/103 R
5,797,015 A * 8/1998 Daniels et al. .............. 717/163
6,049,775 A * 4/2000 Gertner et al. ................ 705/8
6,334,119 B1 * 12/2001 Gagliardi et al. ............. 705/60
6,606,744 B1 * 8/2003 Mikurak ..................... 717/174
6,662,198 B2 * 12/2003 Satyanarayanan et al. ... 707/204
6,701,315 B1 * 3/2004 Austin ......................... 707/10
6,985,245 B1 * 1/2006 Takahashi .................. 358/1.15
2002/0023136 A1 * 2/2002 Silver et al. ................ 709/206
2003/0035669 A1 * 2/2003 Fujii et al. .................. 399/382

* cited by examiner

Primary Examiner—Wei Y Zhen
Assistant Examiner—Chih-Ching Chow
(74) Attorney, Agent, or Firm—Michael J. Cummings; Angelo N. Chaclas

(57) ABSTRACT

A method for controlling transfer of files in a network of inserters at a plurality of sites from a remote command center. The method retrieving inserter data stored at the plurality of inserter sites and storing the data at the command center. The command center further uploading software updates to the plurality of inserters in accordance with a predefined upload/download scheme. The upload/download scheme defined at the command center via a graphical interface. The upload/download scheme identifying one or more of the plurality of inserters for the file transfer transaction, identifying inserter data from the selected one or more inserters to upload to the command center, identifying software updates to download from the command center to the one or more selected inserters, identifying a time for the file transfer transaction, identifying a sequence for the upload and download portions of the transfer transaction; and executing the defined file transfer transaction.

11 Claims, 2 Drawing Sheets

FIG. 2

Transfer Files Form

Upload Files — 211
- Machine(s): AmEx, NYC, Machine 1 — 212
- Upload(s): Job Files — 213
- Additional Files: c:\isc2xx\accessrt\*.dbf — 214
- Upload To Directory: c:\isc\upload — 215
- Execute before Upload: c:\batch\deljobs.bat (210)

Download Files — 221
- Machine(s): AmEx, NYC, Machine 1 — 222
- Download: Software Upgrade — 223
- Download From Directory: c:\isc\software — 224
- Other Download Files: c:\isc2xx\accessrt\*.dbf — 225
- Execute after Download: c:\batch\restart.bat (220)

Setup
- Notification Method: email — 331
- Time to transfer: 24-mar-00; 00:30 — 232
- Interval for retry (minutes): 10 — 233
- Number of retries: 72 — 234

Coordinate Transfers — 235
- ○ None
- ○ Job Upload before Download
- ○ Job Download before Upload
- ● Machine Upload before Download
- ○ Machine Download before Upload (230)

[ Submit ]   [ Clear Form ]

240
200

REMOTE MONITORING AND SOFTWARE DISTRIBUTION SYSTEM FOR SERVICING INSERTER SYSTEMS

This application claims priority under 35 U.S.C.§119(e) from U.S. Provisional Application 60/348,237 dated Oct. 23, 2001, titled REMOTE MONITORING AND SOFTWARE DISTRIBUTION SYSTEM FOR SERVICING INSERTER SYSTEMS, which is hereby incorporated by reference in its entirety.

TECHNICAL FIELD

The present invention relates to a system for upgrading and updating software for use on a network of mutually monitored and controlled inserter systems.

BACKGROUND

Systems for mass producing mail pieces are well known in the art. Such systems are typically used by organizations such as banks, insurance companies and utility companies for producing a large volume of specific mailings like billing statements, or promotional offers. The starting point for the document production process is a stream of print data generated by the organization wishing to create the mailing. The print streams are usually produced by older, legacy, computer systems that are not easily adapted to do more than provide raw print data that is output as a result of the legacy computer systems' business logic.

The raw print stream data may be manipulated using known print stream manipulation software, such as the Streamweaver™ product of Pitney Bowes Inc. Print stream manipulation software allows users to change the look and content of documents, without requiring changes to the legacy computer systems.

Once print stream manipulation is complete, the print stream may be sent to a high volume printer. Such high volume printing results in large rolls or stacks of documents, usually connected in a continuous web. The webs of documents are transported to an inserter machine to be separated into individual pages and turned into mail pieces. Examples of such inserter systems are the 8 series and 9 series inserter systems available from Pitney Bowes Inc. of Stamford Conn.

In many respects the typical inserter system resembles a manufacturing assembly line. Sheets and other raw materials (other sheets, enclosures, and envelopes) enter the inserter system as inputs. A plurality of different modules or workstations in the inserter system work cooperatively to process the sheets until a finished mail piece is produced. The exact configuration of each inserter system depends upon the needs of each particular customer or installation.

Typically, inserter systems prepare mail pieces by gathering collations of documents on a conveyor. The collations are then transported on the conveyor to an insertion station where they are automatically stuffed into envelopes. After being stuffed with the collations, the envelopes are removed from the insertion station for further processing. Such further processing may include automated closing and sealing the envelope flap, weighing the envelope, applying postage to the envelope, and finally sorting and stacking the envelopes.

Each collation of documents processed by the inserter system typically includes a control document having coded control marks printed thereon. Scanners are located throughout the inserter system to sense the presence of the control document and to allow control for processing of a particular mail piece. The coded marks may be bar codes, UPC code, or the like.

The inserter system control system is coupled to each of the inserter system's modular components. The control system stores data files identifying how individual mail pieces should be processed. These data files are typically linked to individual mail pieces by the coded marks included on the control documents. As a collation passes through the inserter system, the coded marks on the control document are scanned and the control system directs the modular components to assemble the mail piece as appropriate. Mail pieces such as billing statements will often include a reply document and/or a return envelope that is pre-addressed for delivery back to the originator of the mail piece. Such reply documents and return envelopes may be used to send back payments, or acceptances of offers, or the like.

Once a finished mail piece has been formed by the inserter system, it may be stacked and provided to a carrier service, such as the U.S. Postal Service, for delivery. Often, in order to receive postal discounts, it is advantageous to sort the outgoing mail in accordance postal regulations. Such output sorting devices are well known. Examples of output sorting devices are available from MailCode, Inc.

The inserter control system also collects data about the efficiency and functioning of the inserter system. For example, the control system can monitor and keep statistics about the speed at which the system is operating, and the rate of errors that occur. Such monitoring may utilize data from tracking mail piece control documents through the inserter system. Additional sensors may also be used to provide further information. For example, optical sensors and scanners may be located at input and output locations for the inserter systems to further monitor and record data concerning inserter processing.

Recently, systems have been developed to monitor and control multiple inserter systems, such as those described above, from remote locations on a network. As such, operation of multiple geographically separate inserter systems can be observed from a centralized control center. Thus, a bank with mail production facilities in Newark and Atlanta can monitor bank statement production activities from its headquarters office in New York City.

SUMMARY OF THE INVENTION

The present invention provides enhancement to such existing systems by providing the ability to receive data files from remote inserter systems, and to transfer files to remote inserter systems, from a central repository. This transfer of files is preferably to upload software updates to the remote inserter machines and to download inserter and mail production data from the remote inserter machines. Control of the transfer of files to and from the central repository can be accomplished through a control website that may be accessed anywhere with Internet access. Such transfers can be scheduled for immediate execution of for any time in the future. The present invention will also notify the originator when such downloads/uploads are complete.

The present invention provides benefits, including archiving of files from remote inserter systems without physically traveling to them; upgrading of software on remote inserter systems without having to physically visit them; scheduling transfer of files anytime without having to physically visit them; transferring files to and from multiple inserter systems at one or more locations simultaneously; supporting multiple protocols for different kinds of machines; and automatic notification to the user when tasks are completed.

SUMMARY OF THE FIGURES

FIG. 2 depicts an exemplary form for use with the present invention in carrying out the desired upload and download functionality.

DETAILED DESCRIPTION

Figure 1:
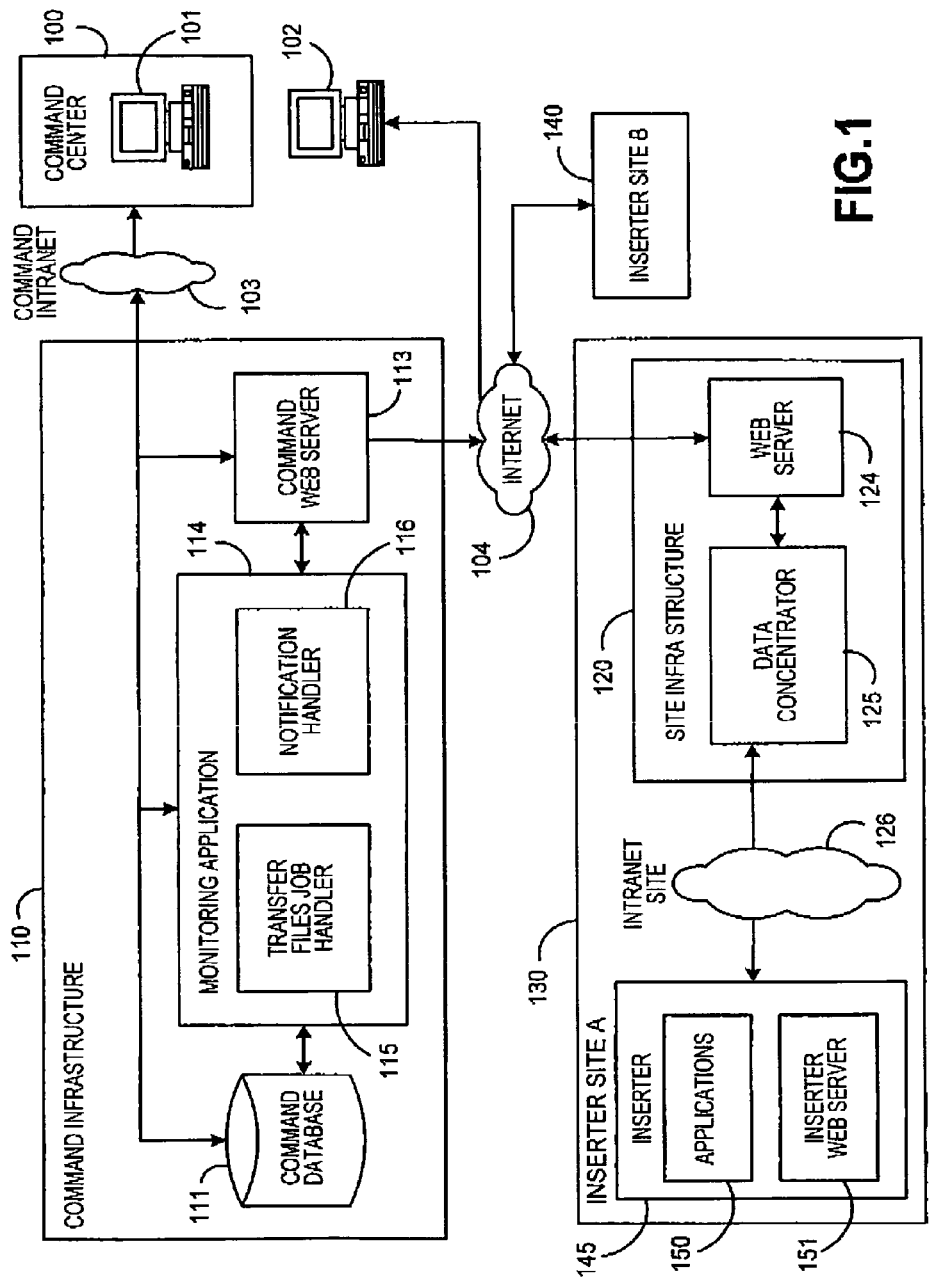
FIG. 1 depicts an exemplary embodiment of an inserter control network for use with the present invention.

In FIG. 1, a system for implementing remote monitoring and software distribution system is depicted. Remote monitoring and software distribution functionality are preferably handled from a command center 100, which may or may not be geographically proximal to the site where documents are being created and formed into mail pieces. Preferably the command center 100 will be capable of monitoring document production sites, e.g. 130 and 140, at a plurality of remote and local locations. Terminal 101 within the command center 100 allow users to interface with the remote monitoring and software distribution system through a command intranet 103. Alternately, a remote terminal 102 may communicate to the command infrastructure 110 through a network 104, such as the Internet.

The command infrastructure 110 is preferably comprised of a command web server 113 to handle communications and data transfer with remote and local network locations. A monitoring application server 114 includes the computer hardware and software for transferring data too and from the command infrastructure 110, and for providing a control and monitoring interface for users. Monitoring data downloaded from the inserter sites 130 and 140 data are stored at the command location in the command database 111. Database 111 may also include the necessary software update information to be provided to the remote inserter sites 130 and 140.

The monitoring application server 114 includes a transfer files job handler 115 for coordinating the uploading and downloading the monitoring data and software updates respectively. A notification handler 116 provides for notification messages to the sent to users to notify them when predetermined events relating to the uploading and downloading of information have occurred.

A remote inserter site 130 (linked via the Internet 104) is preferably comprised of a site infrastructure 120 and to one or more inserter machines 145. The site infrastructure 120 and local inserters 145 are linked via a site intranet 126. The site infrastructure 120 includes a web server 124 for communicating with the remote command infrastructure 110. Site infrastructure 120 further includes a data concentrator 125 that prepares the respective upload and download data for transfer. Within, or associated with, the one or more inserters 145, an inserter web server 151 provides communications capabilities to and from the inserter. Finally inserter applications 150 control the ongoing operation of the inserters 145 in the formation of mail pieces. It is inserter applications 150 that must be periodically updated to provide the latest versions of control software, so that the inserter machine may be run to provide optimal mail piece creation functionality.

The present invention provides file transfer between the command infrastructure 110 and the one or more inserter sites 130, 140. File upload from the command infrastructure 110 is necessary for updating applications 150 in the inserter 145. Such applications may be .exe files, .dll files, or .mdb files.

File downloads from the inserter sites 130, 140 are needed to allow retrieval of files including but not limited to log files, configuration files and mail piece logs generated at the inserters 145.

An authorized user logged onto command center terminal 101 or remote terminal 102 can initiate and control the transfer of files to and from one or more inserter sites 130, 140. In the preferred embodiment all file transfers are implemented using standard ftp client/server communications. All file transfers are initiated from the command infrastructure 110, although the user/controller may be logged into the system from a remote location 102.

The user initiates a file transfer by filling out and submitting a form 200, as depicted in FIG. 2. The information in form 200 is verified and used to create a transfer request. When the transfer request is accepted, the transfer is scheduled for the requested time. Upon the requested time, the files are transferred and the user is notified. A transfer job is created from information gathered from form 200. A unique job ID is assigned to uniquely identify the job A download request portion of a job is created pursuant to the download portion 220 of the transfer form 200. A download request is preferably an XML file and contains a list of inserter machines 145 at the various remote locations and files, as well as a time to perform the transfer. The files are downloaded via FTP to the data concentrators 125 serving the remote inserters 145. A scheduler thread is created for each inserter 145 in the download request. The file information is saved and the thread information sleeps until the given download time.

At the given download time the thread wakes up and increments the data concentrator 125 "FTP Request Flag" for a corresponding inserter 145. When an "FTP Accepted" message is received the files are transferred from the inserter 145. If execution of a file before downloading has been selected by the user, the thread may further send an "Execute File" command to the inserter 145. After all is complete, completion status is reported back to the command infrastructure via an XML file.

Similarly if a user wants the transfer job to include uploading activity, an upload request is created for each data concentrator 125 associated with the job. The upload request is an XML file and contains a list of inserters 145 and files and a time to perform the transfer. The upload request is transferred to the appropriate data concentrators 125. The file information is saved and the thread sleeps until the designated upload time.

At the designated upload time the thread wakes up and increments the "FTP Request Flag" for the inserter 145. The inserter 145 accepts the FTP request and the thread then sends an "Execute File" command. The inserter 145 runs the file and returns and "Execute Done" message. The upload files are transferred to the inserter 145 until all identified upload files are transferred. Completion status is reported back to the command infrastructure 110 via an XML file.

As discussed above, FIG. 2 depicts an exemplary operator interface 200 to be used in conjunction with a web browser. The upload files section 210 includes designations and options for users to define the aspects of jobs relating to uploads. The "machines" field 211 includes a list of customers, sites and inserters that can be designated for upload transfers. A user will select one or more inserters from the "machines" field 211. The "upload" list box 212 contains a list of pre-configured upload jobs. The selections are retrieved from the command database 111. Each selection in the "upload" list box includes a corresponding list of file and directory pairs to upload. One or more upload jobs can be selected in upload field 212. The "additional files" field 213 allows the user to enter additional files that are not included in pre-configured jobs in field 212. Entries in field 213 must include the full path and file specifications, but may contain wildcard characters. The "upload to directory" field 314 specifies the directory on the inserter 145 where the uploaded files are to be copied. The "execute before upload" field 215 specifies a file (executable, batch file, etc.) that is executed on the inserter 145 before the files are uploaded.

The download files section 220 includes designations and options for users to define the aspects of jobs relating to downloads. The "machines" field 221 includes a list of customers, sites and inserters that can be designated for download transfers. A user will select one or more inserters from the "machines" field 221. The "download" list box 222 contains a list of pre-configured download jobs. The selections are retrieved from the command database 111. Each selection in the "download" list box 222 includes a corresponding list of files to down load and the destination directory for each file. One or more upload jobs can be selected in "download" field 222. The "download from directory" field 223 includes the identification of the directory, or directories, from which files should be downloaded. The "other download files" field 224 allows the user to enter additional files to download. Entries in field 224 must include the full path and filed specifications, but may contain wildcard characters. The "execute after download" field 225 specifies a file (executable, batch file, etc.) that is executed on the inserter 145 after the files are downloaded.

The setup section 230 includes designations and options for users to define how the upload and download jobs should be performed. The "notification" list box 231 contains a list of notification methods that may be retrieved from database 111. Notification methods include email, fax, pager, or a screen message that will alert the user that an upload or download event has occurred pursuant to the defined job. The "time to transfer" field 232 is where the date and time for performing the defined transfer is designated. An "interval for retry" field 233 is used to indicate how often frequently a transfer attempt should be retried if an inserter 145 is busy and cannot accept a transfer at a designated time. The "number of retries" field 234 indicates how many retries should be attempted.

The "coordinate transfers" selection box 235 includes several options for coordinating upload and download activity. "None" is used when there is a transfer only in one direction or if no coordination is required (uploads and downloads will occur simultaneously). The "Job Upload Before Download" option forces all uploads on all machines to finish before any download starts. The "Job Download Before Upload" option forces all downloads on all machines to finish before any upload starts. The "Machine Upload Before Download" option forces all uploads on a machine to finish before the download for that machine starts. The "Machine Download Before Upload" option forces all downloads on a machine to finish before the upload for that machine starts.

Upon completion of the form 200, the submit button 240 may be pressed and a corresponding transfer job will be created and stored.

Events occurring during a transfer job are asynchronous. Since multiple sites 130, 140 and multiple inserters 145 may be included in the transfer the error handling is done on an inserter by inserter basis. A status condition of each transfer job on each inserter is maintained in the database 111. Each error condition is handled on an individual basis. An error only affects the entire job as it affects the completion of a task to be performed before a subsequent task is started (i.e. if the "complete download before upload" condition is set and there is an error on the download then the upload cannot proceed.).

If the command infrastructure 110 is unable to transfer a file to or from a data concentrator 125, a thread is created to sleep and retry. The retry time and count from the form 200 are used. If the command infrastructure 110 tries the maximum amount of times without success, a failure status is stored in the database 111 for each inserter 145 involved on that data concentrator 125. The user may be notified via the notification handler 216 in accordance with the method selected from field 231 on form 200.

Similarly, if a data concentrator 125 is unable to transfer a file to or from an inserter 145, a thread is created to sleep and retry. The retry time and count from the form 200 are used. If the data concentrator 125 tries the maximum amount of times without success, a failure status is stored in the database 111 for each inserter 145 involved on that data concentrator 125. The user may be notified via the notification handler 116 in accordance with the method selected from field 231 on form 200.

Thus, although the invention has been described with respect to a preferred embodiment thereof, it will be understood by those skilled in the art that the foregoing and various other changes, omissions and deviations in the form and detail thereof may be made without departing from the scope of this invention, as further described in the following claims.

What is claimed is:

1. A method for controlling transfer of files in a network of mail production inserter machines for processing printed mail, the network of mail production inserter machines including a plurality of inserter machines located at a plurality of inserter sites, and a command center at a command site remote from the inserter sites, the method comprising:

storing mail production inserter data at the plurality of inserter sites, wherein the mail production inserter data includes data pertaining to individual printed mail items;

storing software updates distribution to the remote inserter sites;

defining a file transfer transaction using a command center computer interface, the step of defining the file transfer transaction further including:

selecting one or more of the plurality of mail production inserter machines for the file transfer transaction;

identifying inserter data from the selected one or more mail production inserter machines to transfer to the command center;

identifying software updates to transfer from the command center to the one or more selected production inserter machines;

identifying a time for the file transfer transaction;

identifying a sequence for inserter data transfer and software update portions of the file transfer transaction; and executing the defined file transfer transaction.

2. The method of claim 1 wherein the step of defining the file transfer transaction further includes identifying a file to be executed at the one or more mail production inserter machines prior to the transfer of data.

3. The method of claim 1 wherein the step of defining the file transfer transaction further includes identifying a file to be executed at the one or more mail production inserter machines after the transfer of update software.

4. The method of claim 1 wherein the step of defining the file transfer transaction further includes identifying a notification method for providing notice of the status of the file transfer transaction and the method further includes the step of implementing the notification method upon execution of the file transfer transaction.

5. The method of claim 1 wherein the step of identifying the sequence for inserter data transfer and software update portions of the transfer transaction further includes the step of identifying whether proceeding to a next step in the sequence may proceed before an initial step of the sequence is complete on all mail production inserter machines affected by the file transfer transaction.

6. The method of claim 1 wherein the step of defining the file transfer transaction using the command center computer interface further includes accessing the command site from a remote terminal via the internet.

7. A system for remote monitoring and control of a network of inserters mail production inserter machines for processing printed mail, the network of mail production inserter machines including a plurality of mail production inserter machines located at a plurality of inserter sites, the system comprising:
   a command center remote from the plurality of inserter sites, the command center including:
      a storage device for storing software updates to be supplied to the plurality of mail production inserter machines;
      an application server providing a file transfer creation interface to create a definition of a file transfer transaction, the definition being stored in a database, the definition including identification of one or more of the plurality of mail production inserter machines for the file transfer transaction, inserter data from the selected one or more mail production inserter machines to transfer to the command center, software updates for distribution to the remote inserter sites to transfer from the command center to the one or more selected mail production inserter machines, a time for the file transfer transaction, and a sequence for inserter data transfer and software update portions of the transfer transaction, wherein inserter data includes data pertaining to individual printed mail items; and
      a first network server communicating the file transfer transaction definition to the one or more remote inserter sites;
   the remote inserter sites each including:
      an inserter running in accordance with inserter software, the inserter further generating inserter data corresponding to performance of the inserter;
      a data concentrator controlling the file transfer transaction in accordance with the file transfer definition at the one or more remote inserter sites; and
      a second network server communicating with the first network server; and wherein software updates are transferred to the inserter from the command center and inserter data is transferred from the inserter site to the command center in accordance with the definition of the file transfer transaction.

8. The system of claim 7 wherein the definition of the file transfer transaction further includes identifying a file to be executed at the inserter prior to the transfer of inserter data to the command center, and the inserter executing the file in accordance with the definition.

9. The system of claim 7 wherein the definition of the file transfer transaction further includes identifying a file to be executed at the inserter after the transfer of update software from the command center, the inserter executing the file in accordance with the definition.

10. The system of claim 7 wherein the command center further includes a notification handler for sending notifications to users providing notice of the status of the file transfer transaction, and wherein the definition of the file transfer transaction includes identification of a notification method for providing notice of the status of the file transfer transaction and the notification handler implements the notification method upon execution of the file transfer transaction.

11. The system of claim 7 wherein the definition of the file transfer transaction further includes identification of whether proceeding to a next event in the sequence may proceed before an initial event of the sequence is complete on all mail production inserter machines affected by the file transfer transaction.

* * * * *